United States Patent
Dodd et al.

(10) Patent No.: US 8,069,710 B2
(45) Date of Patent: Dec. 6, 2011

(54) REMOTE FUELING SYSTEM AND PROCESS

(75) Inventors: Michael Shannon Dodd, Duncan, OK (US); Michael J. R. Segura, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 154 days.

(21) Appl. No.: 12/731,313

(22) Filed: Mar. 25, 2010

(65) Prior Publication Data

US 2011/0232376 A1  Sep. 29, 2011

(51) Int. Cl.
*G01M 15/04* (2006.01)
(52) U.S. Cl. ..................................................... 73/114.54
(58) Field of Classification Search ............... 73/114.52, 73/114.53, 114.54
See application file for complete search history.

(56) References Cited

U.S. PATENT DOCUMENTS

| | | | |
|---|---|---|---|
| 4,290,495 A * | 9/1981 | Elliston | 175/85 |
| 4,591,006 A * | 5/1986 | Hutchison et al. | 175/52 |
| 4,658,873 A | 4/1987 | von Meyerinck et al. | |
| 4,658,874 A | 4/1987 | von Meyerinck et al. | |
| 4,828,033 A * | 5/1989 | Frison | 166/307 |
| 7,249,629 B2 * | 7/2007 | Cunningham et al. | 166/77.1 |
| 2010/0071899 A1 * | 3/2010 | Coquilleau et al. | 166/268 |

* cited by examiner

*Primary Examiner* — Freddie Kirkland, III
(74) *Attorney, Agent, or Firm* — John W. Wustenberg; Conley Rose, P.C.

(57) ABSTRACT

A remote fueling system is provided. The system comprises a wellbore servicing equipment unit comprising an internal combustion engine, a fuel tank coupled to the internal combustion engine, a fuel distribution channel, a fuel level sensor component, a fuel level indicator, and a fuel level indicator control box. The wellbore servicing equipment is mounted on a trailer upon which the wellbore servicing equipment is transported to the wellbore. The fuel level sensor component senses a fuel level inside the fuel tank. The fuel level indicator indicates a fuel level status of the fuel tank to remote fueling personnel at a standoff distance. The fuel level indicator control box is coupled to the fuel level sensor component and to the fuel level indicator and commands the indication presented by the fuel level indicator based on the fuel level inside the fuel tank sensed by the fuel level sensor component.

20 Claims, 8 Drawing Sheets

REMOTE FUELING SYSTEM AND PROCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbore servicing operations may include cementing a casing in the wellbore, perforating the casing at one or more production zones, fracturing a formation to enhance flow of hydrocarbons from a production zone, acidizing a formation to enhance flow of hydrocarbons, and other like operations. Wellbore servicing operations may be performed by a specialized wellbore servicing company engaged by the company that is managing the subject well. The wellbore servicing company may transport wellbore servicing units, for example high pressure pumping units, to the wellbore location on tractor-trailers and/or on bodyload unit vehicles specialized for transportation to and operations at remote locations. Wellbore locations may be in remote areas lacking services and utilities that may be commonly available in developed urban and/or suburban areas.

SUMMARY

In an embodiment, a remote fueling system is provided. The system comprises a wellbore servicing equipment unit comprising an internal combustion engine and a trailer on which the wellbore servicing equipment unit is mounted during transportation to a wellbore and during servicing of the wellbore. The system further comprises a first fuel tank coupled to the trailer, the first fuel tank to provide fuel to the internal combustion engine. The system further comprises a first fuel distribution channel to flow fuel from a remote end of the first fuel distribution channel to an opposite end of the first fuel distribution channel, wherein the opposite end of the first fuel distribution channel is coupled to the first fuel tank. The system further comprises a first fuel level sensor component coupled to the first fuel tank to sense a fuel level inside the first fuel tank and a first fuel level indicator to indicate to remote fueling personnel at a standoff distance a fuel level status of the first fuel tank. The system further comprises a fuel level indicator control box coupled to the first fuel level indicator and to the first fuel level sensor component, wherein the fuel level indicator control box commands the indication presented by the first fuel level indicator based on the fuel level inside the first fuel tank sensed by the first fuel level sensor component.

In another embodiment, a remote fueling system is provided. The system comprises a fuel coupling located at a front of a wellbore servicing vehicle, wherein the fuel coupling is mechanically attached to the wellbore servicing vehicle, a fuel tank attached to the wellbore servicing vehicle, and plumbing between the fuel coupling and the fuel tank to promote filling the fuel tank with fuel from the fuel coupling, at least some of the plumbing between the fuel coupling and the fuel tank attached to the wellbore servicing vehicle during transportation to a wellbore and during servicing of the wellbore. The system further comprises a first fuel sensor to determine when a fuel level in the fuel tank is at least at a first level and a second fuel sensor to determine when the fuel level in the fuel tank is at least at a second level. The system further comprises a first indicator light and a second indicator light. The system further comprises an indicator light control box coupled to the first fuel sensor, to the second fuel sensor, to the first indicator light, and to the second indicator light, wherein the indicator light control box illuminates the first indicator light when the second fuel sensor does not sense the fuel level in the fuel tank is at least at the second level and illuminates the second indicator light when the first fuel sensor senses the fuel level in the fuel tank is at least at the first level.

In another embodiment, a remote fueling method is disclosed. The method comprises transporting a wellbore servicing unit that is coupled to a vehicle to a wellbore, the wellbore servicing unit comprising an internal combustion engine, and coupling the wellbore servicing unit to the wellbore. The method further comprises coupling a refueling system to a fuel fill coupling mechanically attached to the vehicle, the fuel fill coupling connected via a fuel distribution channel to a fuel tank coupled to the vehicle proximate to the internal combustion engine, and running the internal combustion engine to operate the wellbore servicing unit, the internal combustion engine fueled from the fuel tank. The method further comprises determining from a standoff distance that a fuel level in the fuel tank is less than a first level by observing an indicator coupled to an indicator control box, the indicator control box coupled to a fuel sensor in the fuel tank, delivering fuel to the fuel tank from the refueling system, determining from the standoff distance that the fuel level in the fuel tank is at least at a second level by observing the indicator, and stopping delivering fuel to the fuel tank from the refueling system based on the determination from the standoff distance that the fuel level in the fuel tank is at least at the second level.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Figure 1:
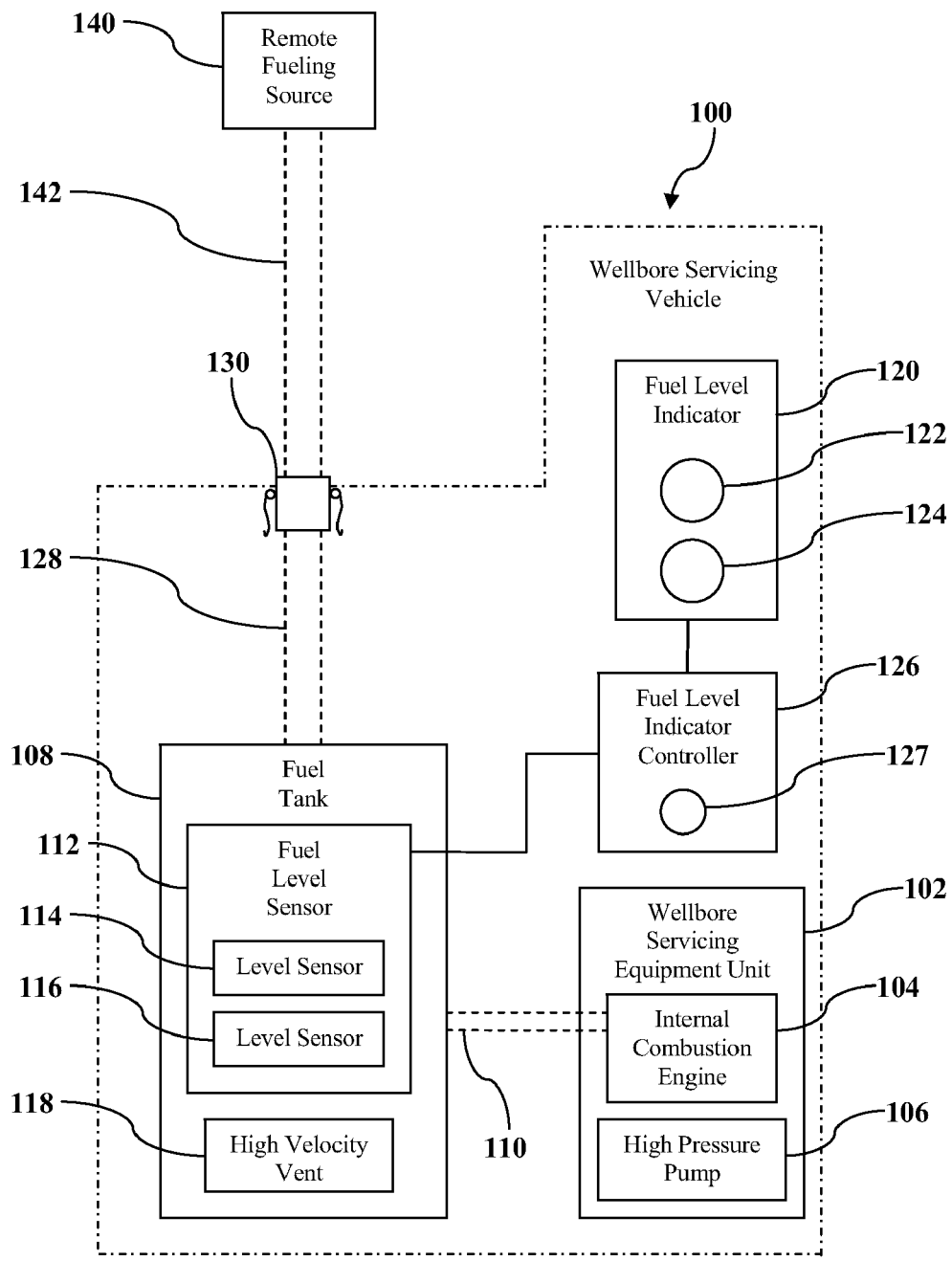
FIG. 1 is a block diagram of a remote fueling system according to an embodiment of the disclosure.

Turning now to FIG. 1, a first remote fueling system 100 is described. In an embodiment, the first system 100 comprises a wellbore servicing equipment unit 102 that comprises an internal combustion engine 104 that provides motive power to a high pressure pump 106. In other embodiments, however, the high pressure pump 106 may be replaced by other wellbore servicing equipment coupled to and receiving power from the internal combustion engine 104. The system further comprises a fuel tank 108 that may feed fuel to the internal combustion engine 104 via a fuel line 110, and the fuel tank 108 may further comprise a fuel level sensor 112. In an embodiment, the fuel level sensor 112 may comprise a first level sensor 114 and a second level sensor 116. In an embodiment, the fuel tank 108 may further comprise a high velocity vent 118. The first system 100 further comprises a fuel level indicator controller 126 and a fuel level indicator 120. The fuel level indicator controller 126 is coupled to the fuel level sensor 112 and coupled to the fuel level indicator 120. In an embodiment, the fuel level indicator 120 comprises a first indicator 122 and a second indicator 124. The first system 100 further comprises a fuel distribution channel 128 (e.g., fluid flow channel or path) and a fuel coupling 130 through which the fuel tank 108 may be remotely fueled from a standoff distance by a remote fueling source 140, for example through a remote fueling line 142 connected to the fuel coupling 130.

Figure 2:
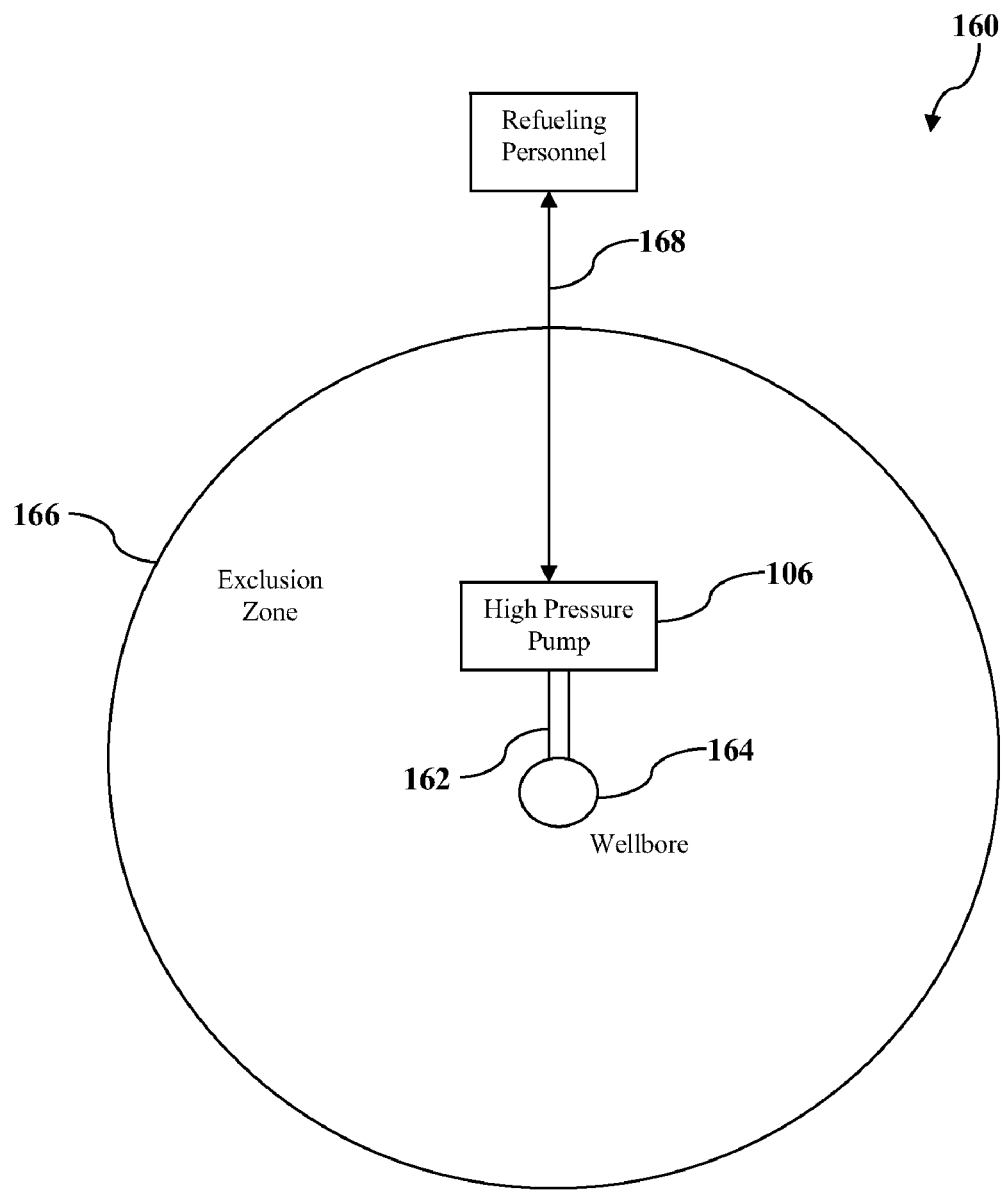
FIG. 2 is an illustration of an exclusion zone and a remote fueling standoff distance related to wellbore servicing equipment coupled to a wellbore according to an embodiment of the disclosure.

Turning now to FIG. 2, an exemplary wellbore location 160 is described. As illustrated schematically in FIG. 2, the wellbore location 160 may comprise the high pressure pump 106 coupled via a high pressure pipe 162 to the wellbore 164, typically via a wellhead (e.g., Christmas tree) located at the surface of the wellbore. Because high pressures generated by the pump 106, for example during a stimulation servicing operation such as a fracturing job, may create dangerous hazards, in some circumstances it is desirable for all personnel to remain outside of an exclusion zone 166 while high pressure is applied. The exclusion zone 166 may be defined by a circle defined by a radius from the high pressure pump 106, the high pressure pipe 162, and the wellbore 164. In other circumstances, the exclusion zone 166 may have a different shape and may be defined somewhat differently (e.g., roped or taped off a given distance). Some wellbore servicing operations may take many hours to complete. The limited capacity of the fuel tank 108 may not be sufficient to supply fuel to the internal combustion engine 104 throughout the duration of the wellbore servicing operation without refueling. The first system 100 promotes remote monitoring of the fuel level in the fuel tank 108 and remote fueling of the fuel tank 108 by refueling personnel from a safe standoff distance 168. In some embodiments, the safe standoff distance 168 may be about 75 feet, but in other embodiments another safe standoff distance 168 may be defined based on the pressure generated by the pump 106, based on the safety policy of the wellbore servicing company, based on the safety policy of the company managing the wellbore, based on the safety policy of an insurance carrier, based on governmental safety regulations, or based on other considerations. In various embodiments, the safe standoff distance 168 may be equal to or greater than about 25, 50, 75, 100, 125, 150, 175, 200, 225, 250, 275, or 300 feet. In another embodiment, the safe standoff distance may be a distance effective to mitigate the risk of injury to personnel in the event of an equipment failure and/or an operating accident.

Turning again to FIG. 1, in an embodiment, the components of the first system 100 may be permanently or semi-permanently installed on and/or attached to a vehicle, for example a tractor-trailer or 18-wheeler vehicle. Alternatively, the components of the first system 100 may be permanently or semi-permanently installed on a vehicle comprising a single, self-contained unit as one integral piece of equipment, which may be referred to as a bodyload unit and/or a bodyload unit vehicle. The installation of the first system 100 on the vehicle may be suitable for conveying the first system 100 reliably and safely over public highways, secondary roads, and primitive oilfield roads to the wellbore location. The wellbore servicing equipment unit 102 may, for example, be positioned and attached (e.g., bolted or welded) to a bed of the trailer. The fuel tank 108, fuel level indicator controller 126, fuel lever indicator 120, fuel coupling 130, and fuel distribution channel 128 may be attached to the trailer and/or the tractor and/or bodyload unit, for example with supporting metal bands, metal brackets, welded, nuts and bolts, or with other attaching hardware. It is understood that in different embodiments different numbers and/or types of couplings may be employed, either more or fewer couplings and possibly different kinds of couplings.

Figure 3:
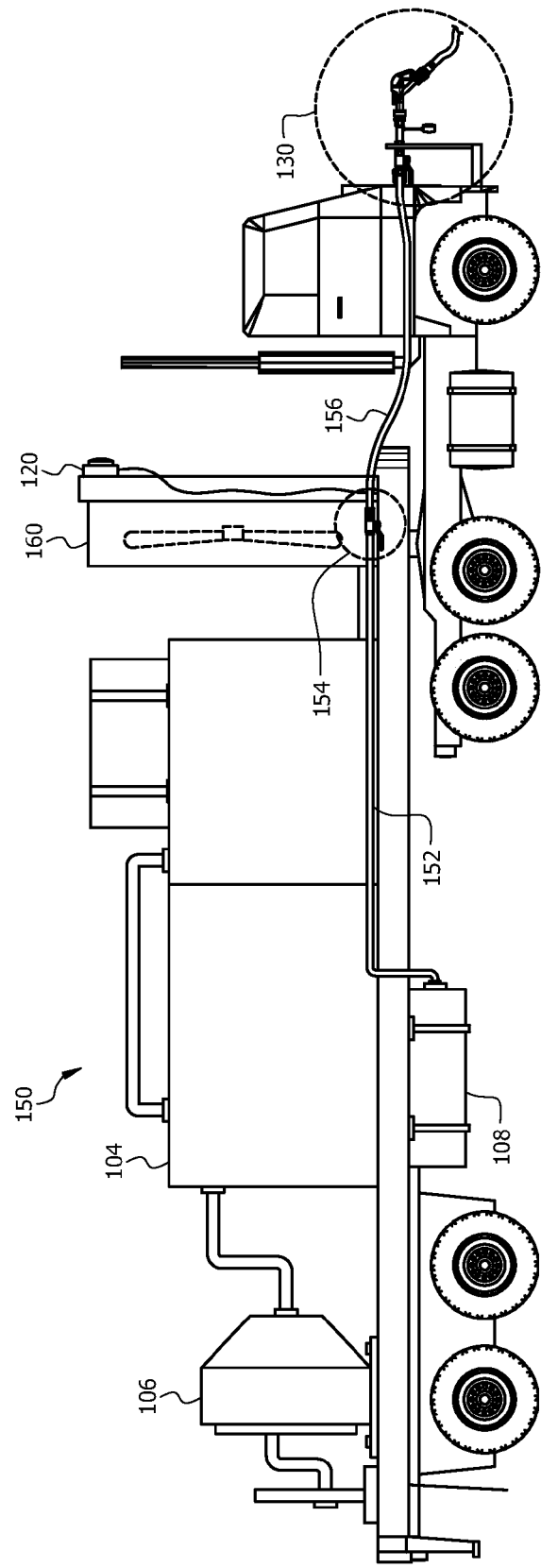
FIG. 3 is an illustration of a remote fueling system according to an embodiment of the disclosure.

Turning now to FIG. 3, a second remote fueling system 150 is described. The second system 150 may be substantially similar to the first system 100 described above with reference to FIG. 1. The second system 150 in FIG. 3 is illustrated in a less abstracted form to help the reader to more concretely conceptualize an embodiment of the second system 150, but it will be readily appreciated by those skilled in the art that a variety of alternatives and different configurations are comprehended by the remote fueling system taught by the present disclosure. The fuel distribution channel 128 discussed above with reference to FIG. 1 may comprise a metal fuel line 152, a second fuel coupling 154, and a flexible fuel line 156. The metal fuel line 152 may extend from a front portion of the trailer to an area proximate to the fuel tank 108 and may be attached to the trailer by metal brackets and/or metal bands either permanently or semi-permanently. In an embodiment, the flexible fuel line 156 may be removed when driving the second remote fueling system 150 over roads, to allow for the turning of a tractor and/or cab portion with respect to a trailer portion of second system 150. In an embodiment where a bodyload unit type of vehicle is employed, there may be no need for the flexible fuel line 156, and the metal fuel line 152 may extend from the fuel tank 108 all the way to the first fuel coupling 130. The flexible fuel line 156 may then be installed by coupling the second fuel coupling 154 to the metal fuel line 152 and by coupling the flexible fuel line 156 to the first fuel coupling 130 when the second remote fueling system 150 is parked at the well site. In an embodiment, the fuel level indicator 120 may be mounted to a heat exchanger 160 or other apparatus on the second system 150. In an embodiment, the heat exchanger 160 may be a radiator and/or a radiator in combination with a rotating fan mounted to the trailer. It is understood that in different embodiments different numbers and/or types of couplings may be employed, either more or fewer couplings and possibly different kinds of couplings.

Figure 4:
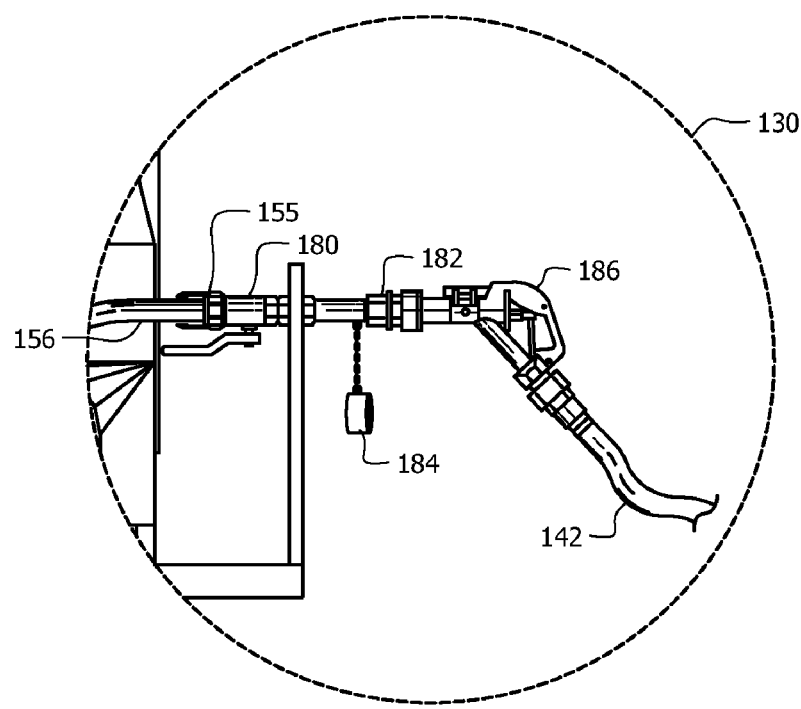
FIG. 4 is an illustration of a fuel coupling according to an embodiment of the disclosure.

Turning now to FIG. 4, further details of an embodiment of the first fuel coupling 130 are described. In an embodiment, the first fuel coupling 130 may comprise additional components including a shut-off valve 180, a coupling 182, and a coupling cover 184. In an embodiment, the first fuel coupling may be affixed to the tractor via a frame or bracket, for example a frame extending from the front bumper of the tractor. The fame may be rigidly mounted to the tractor (e.g., welded) such that the first fuel coupling remains in a position similar to that shown in FIG. 4 while the tractor is in motion. Alternatively, the frame may be removably mounted to the tractor, for example via a male/female slide in connection such as those used in trailer-hitch mounts, and thus may remain in place while the tractor is in motion or may be removed before placing the tractor in motion. While the second system 150 is driving over roadways and/or while not coupled to the remote fueling line 142, the coupling cover 184 may be attached to the coupling 182, for example screwed onto a threaded portion of the coupling 182, to keep dirt or other objects out of the coupling 182. The remote fueling line 142 may couple to the coupling 182 by an elbow coupling 186 (e.g., a trigger or pull handle actuated fueling nozzle or "gun" having an internal shut off valve/mechanism that may be activated automatically, e.g., via back pressure, and/or manually). The flexible fuel line 156 may be attached to the shut-off valve 180 via a third fuel coupling 155. In an embodiment, the third fuel coupling 155 may be a cam lock type of coupler. In another embodiment, however, the third fuel coupling may be a different type of coupling mechanism.

Figure 5:
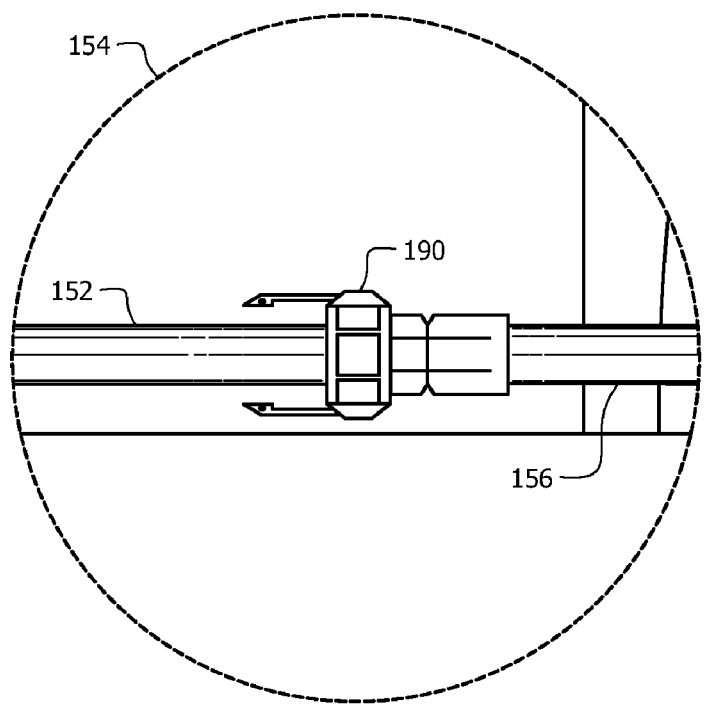
FIG. 5 is an illustration of another fuel coupling according to an embodiment of the disclosure.

Turning now to FIG. 5, further details of the second fuel coupling 154 are described. In an embodiment, the metal fuel line 152 may couple to the flexible fuel line 156 by a cam lock type coupling 190. In another embodiment, however, the metal fuel line 152 may couple to the flexible fuel line 156 using a different type of coupling mechanism. It is understood that while the cam lock type couplings may be represented in the figures with an implied directional orientation, in different embodiments the sense of direction of the cam lock couplings may be reversed. For example, in an embodiment, a cam lock type coupling may be attached to each end of the flexible fuel line 156. In alternative embodiment, a first cam lock type coupling may be attached to the metal fuel line 150 and couple to an appropriate fitting on an end of the flexible fuel line 156 and a second cam lock type coupling may be attached to the shut-off valve 180 and couple to an appropriate fitting on an end of the flexible fuel line 156. In an embodiment, the cam lock type of coupling and/or couplings described above (e.g., couplings 155 and/or 190) may be obtained from the EMCO company. In another embodiment, however, some other form of fuel coupling may be employed.

In an embodiment, the metal fuel line 152 may slope downwards from the front of the trailer towards the rear of the trailer, whereby fuel in the metal fuel line 152 flows by force of gravity towards the fuel tank 108. In an embodiment, when the trailer is parked on a level grade the rear end of the metal fuel line 152 may be at least four inches lower than the front end of the metal fuel line 152. In an embodiment, the rear end of the first portion of the metal fuel line 152 may be about six inches lower than the front end of the metal fuel line 152. In an embodiment, the slope of the metal fuel line 152 may have a different slope. In an embodiment, a fuel drain cock may be plumbed into the fuel coupling 130 to drain residual fuel left over from remote fueling operations, for example draining from the fuel drain cock into a line that drains into a bucket. The diameter of the metal fuel line 152 and of the flexible fuel line 156 may be selected to have a diameter that is effective to reduce friction pressure associated with flowing fuel from the fuel coupling 130 to the fuel tank 108. Likewise, the number of bends and the rate of bends in the metal fuel line 152 may be selected and/or designed to reduce friction pressure associated with flowing fuel from the fuel coupling 130 to the fuel tank 108. Reduction of friction pressure associated with flowing fuel from the fuel coupling 130 to the fuel tank 108 may be desirable when the remote fueling source 140 is operable to kick out and stop fueling in response to an increased back pressure above a threshold amount in the remote fueling line 142. For example, an increase in back pressure may cause a release mechanism or trigger of the elbow coupling 186 to activate and shut-off the flow of fuel.

In an embodiment, the fuel tank 108 may be located about two-thirds of the distance from the front of the trailer to the rear of the trailer. In another embodiment, the fuel tank 108 may be located about three-fourths of the distance from the front of the trailer to the rear of the trailer. In another embodiment, the fuel tank 108 may be located about four-fifths of the distance from the front of the trailer to the rear of the trailer. In another embodiment, the fuel tank 108 may be located about five-sixths of the distance from the front of the trailer to the rear of the trailer. It is understood, notwithstanding the descriptions of couplings associated with FIG. 5 and FIG. 6, that in different embodiments different numbers and/or types of couplings may be employed, either more or fewer couplings and possibly different kinds of couplings.

Turning again to FIG. 1, in some contexts the fuel level sensor 112 may be referred to as a fuel level sensor component. In an embodiment, the first level sensor 114 detects the presence of fuel at a first level in the fuel tank 108, for example at a one-half full level in the fuel tank. In an embodiment, the second level sensor 116 detects the presence of fuel at a second level in the fuel tank 108, for example at a three-fourths full level in the fuel tank. In another embodiment, however, the first level sensor 114 and the second level sensor 116 may be located at different positions to detect the presence of fuel at different levels in the fuel tank 108. In an embodiment, a different number of level sensors may be located within the fuel tank 108. For example, in an embodiment, three level sensors may be located within the fuel tank 108 to determine the presence of fuel at three different levels within the fuel tank 108. For example, in an embodiment, four level sensors may be located within the fuel tank 108 to determine the presence of fuel at four different levels within the fuel tank 108. In an embodiment, the fuel level sensor 112 may comprise a system that provides a different kind of indication of fuel level within the fuel tank 108, for example a continuous analog voltage encoding a range of fuel levels within the fuel tank 108 or a digital signal encoding a range of fuel levels within the fuel tank 108.

The fuel level indicator controller 126 may be housed within a ruggedized equipment cabinet that protects the control components from physical shock, from rain, from liquid spills, and from other hazards. A logic portion of the fuel level indicator controller 126 may be implemented as a computer system. Computer systems are discussed in detail hereinafter with reference to FIG. 9. Alternatively, the logic portion of the fuel level indicator controller 126 may be implemented as a programmable logic controller (PLC). Other portions of the fuel level indicator controller 126 may comprise indicator driver circuitry, solenoids or solid state relays to control illumination power sourcing to the fuel level indicator 120, a power conditioning unit, and/or a battery. The fuel level indicator controller 126 may further comprise a test button 127 to test the functionality of the fuel level indicator controller 126 and/or the functionality of the fuel level indicator 120.

The logic portion of the fuel level indicator controller 126 monitors the indication of fuel levels from the fuel level sensor 112 and commands the indications of the fuel level indicator 120, for example commands the illumination of the first indicator 122 and the second indicator 124. In an embodiment, when the fuel level indicator controller 126 is operable and the fuel level indicator 120 is operable, at least one of the indicators 122, 124 may be illuminated at all times. If none of the indicators 122, 124 is illuminated, a fault is present. In an embodiment, if the second level sensor 116 does not indicate the presence of fuel, the fuel level indicator controller 126 commands the illumination of the first indicator 122; when the second level sensor indicates the presence of fuel, the fuel level indicator controller 126 commands the extinguishment of the first indicator 122; when the first level sensor indicates the presence of fuel, the fuel level indicator controller 126 commands the illumination of the second indicator 124; and when the first level sensor does not indicate the presence of fuel, the fuel level indicator controller 126 commands the extinguishment of the second indicator 124. In an embodiment where the first level sensor 114 indicates the presence of fuel at the one-half full level of the fuel tank 108 and the second level sensor 116 indicates the presence of fuel at the three-fourths full level of the fuel tank 108, the various combinations of illumination/extinguishment of the indicators 122, 124 may be charted as follows:

TABLE 1

| Fuel level in fuel tank 108 | First Indicator 122 (e.g., green light) | Second Indicator 124 (e.g., red light) |
| --- | --- | --- |
| Less than ½ full | Illuminated | Extinguished |
| Between ½ and ¾ full | Illuminated | Illuminated |
| More than ¾ full | Extinguished | Illuminated |
| System Inoperable | Extinguished | Extinguished |

In different embodiments, the level sensors 114, 116 may be placed at different positions in the fuel tank 108 to detect different fuel levels. It is understood that with level sensors 114, 116 positioned at different levels, corresponding differences are needed in the information presented in Table 1 above. For example, in a different embodiment, the indications may be preferred to detect greater or less than ⅘ full and greater and less than ⅕ full, which would be implemented by suitably locating the level sensors 114, 116 within the fuel tank 108 at about the ⅘ full level and at about the ⅕ full level and adjusting the table 1 accordingly. Additionally, it is understood that if more than two level sensors 114, 116 are employed, the fuel level indicator 120 may be comprised of different numbers of indicators 122, 124, that different numbers of columns may be needed in Table 1, and corresponding differences may be needed in the information presented in Table 1.

The fuel level indicator 120 and the first indicator 122 and the second indicator 124 are positioned to be visible to remote fueling personnel located at least at the standoff distance 168 and possibly beyond. The first indicator 122 and the second indicator 124 may comprise a plurality of light emitting diodes (LEDs), incandescent lights, compact fluorescent lights, or other light sources. The first indicator 122 and the second indicator may be readily discerned to be illuminated or extinguished during either of daylight or night time lighting conditions on the well location. The first indicator 122 may illuminate with a first color and the second indicator 124 may illuminate with a second color. In an embodiment, the first indicator may be a green color and the second indicator may be a red color, but in other embodiments the indicators 122, 124 may have different colors. For example, a green light alone may represent that refueling is needed (i.e., the system is low), a red light alone may represent stop refueling (i.e., the system is full), and red and green lights together represent an intermediate condition (i.e., the system is between low and full). Additionally, in some embodiments, the indicators 122, 124 may be the same color or colorless. By commanding electrical power to the first indicator 122 and/or the second indicator 124, for example from a battery and/or power conditioning equipment, through solenoid contacts and/or solid state relay contactors, to the indicators 122, 124, the logic component of the fuel level indicator controller 126 commands the fuel level indicator 120 and promotes the remote monitoring by remote fueling personnel of the fuel level in the fuel tank 108. In an embodiment, the fuel level indicator 120 may not be implemented using light devices. In another embodiment, the fuel level indicator 120 may comprise a gauge or a meter which is visible from a standoff distance for indicating a fuel level of the fuel tank 108.

Pressing the test button 127 may cause the fuel level indicator controller 126 to execute a self-test routine. The self-test routine may illuminate and extinguish the indicators 122, 124 in a pre-determined pattern to confirm the functionality of the indicators 122, 124, the availability of electrical power to drive the indicators 122, 124, and the ability of the logic component of the fuel level indicator controller 126 to command the illumination and extinguishing of the indicators 122, 124. If pressing the test button 127 does not lead to the illumination and extinguishing of the indicators 122, 124 in the expected pre-determined pattern, some fault may exist in the first system 100 that needs to be further investigated before beginning the wellbore servicing operation.

Figure 6:
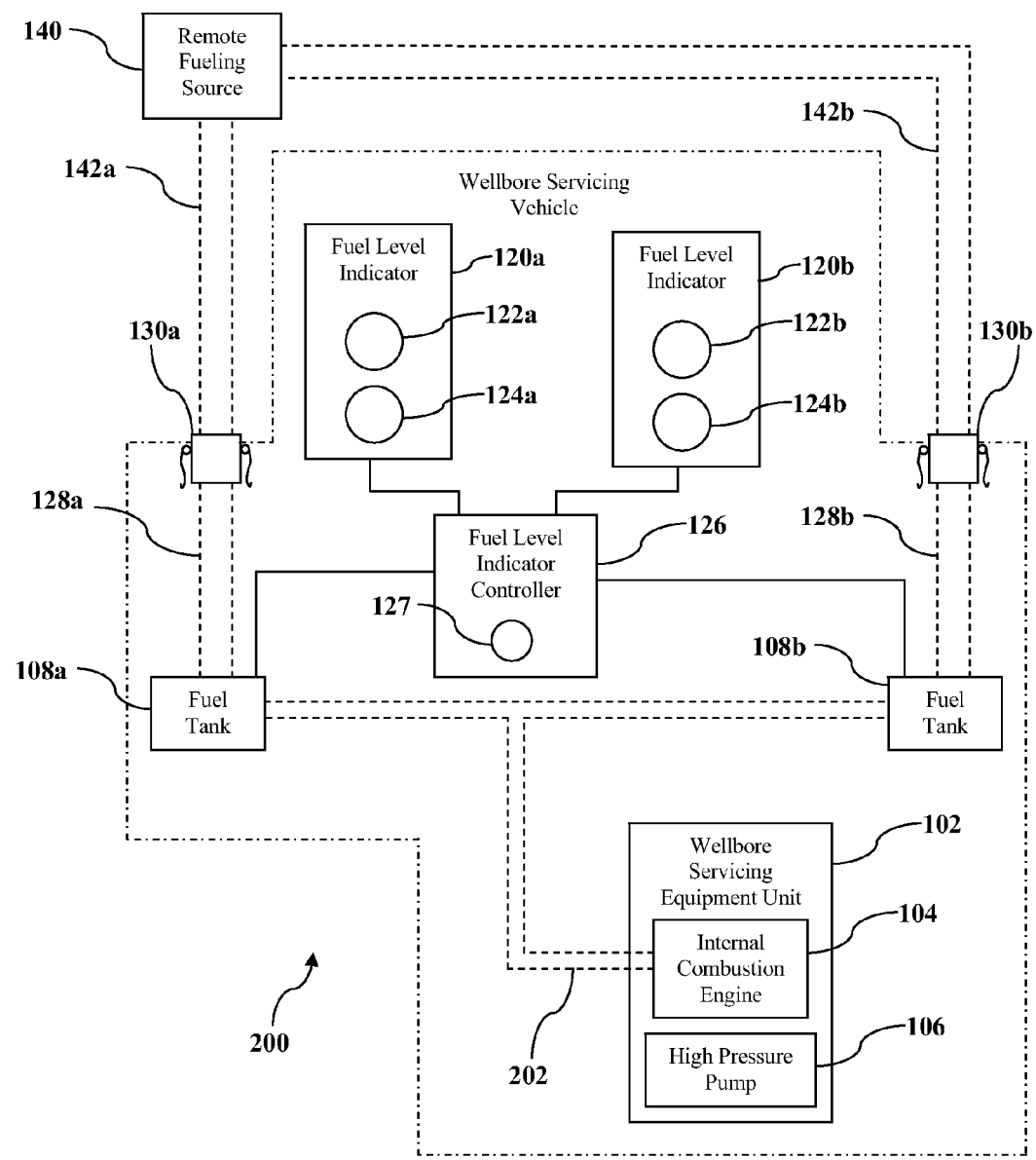
FIG. 6 is a block diagram of another remote fueling system according to an embodiment of the disclosure.

Turning now to FIG. 6, a third remote fueling system 200 is described. The third system 200 is substantially similar to the first system 100 and to the second system 150 except that the third system 200 is designed to support refueling a two fuel tank servicing vehicle. The third system 200 comprises a first fuel tank 108a, a second fuel tank 108b, a first fuel level indicator 120a a second fuel level indicator 120b, a first fuel distribution channel 128a, a second fuel distribution channel 128b, a first fuel coupling 130a, a second fuel coupling 130b, a first remote fueling line 142a, and a second remote fueling line 142b. In an embodiment, the first fuel distribution channel 128a and the second fuel distribution channel 128b may be located on the same side of a tractor-trailer. For example, the first fuel distribution channel 128a may comprise a first metal fuel line, a coupling, and a flexible fuel line, as described above with reference to FIG. 3, and the second fuel distribution channel 128b may comprise a second metal fuel line, a coupling, and a second flexible fuel line all located on the same side of the tractor-trailer, for example a passenger side of the tractor-trailer. In an embodiment, a rear end portion of the second metal fuel line may cross over to an opposite side of the trailer, to couple to the second fuel tank 108b. In an embodiment, the first fuel tank 108a comprises one or more fuel level sensors substantially similar to those described with reference to FIG. 1. Likewise, in an embodiment, the second fuel tank 108b comprises one or more fuel level sensors substantially similar to those described with reference to FIG. 1.

In an alternative embodiment, the third remote fueling system 200 may comprise only one fuel distribution channel 128 that feeds one of the fuel tanks 108 and then cross-feeds from that fuel tank to the other fuel tank via a cross-feed line, thereby filling both fuel tanks 108a, 108b from the one fuel distribution channel 128. Alternatively, the single fuel distribution channel 128 may fork, branch, or "T" to feed fuel to the first fuel tank 108a via a first fork or branch and to feed fuel to the second fuel tank 108b via a second fork or branch, thereby filling both fuel tanks 108a, 108b from the one fuel distribution channel 128.

In an embodiment, the third system 200, like the first system 100, comprises the wellbore servicing equipment unit 102 which is comprised of the internal combustion engine 104 and the high pressure pump 106. In another embodiment, however, the wellbore servicing equipment unit 102 of the third system 200 may comprise another servicing device other than the high pressure pump 106. The third system 200, like the first system 100, comprises the fuel level indicator controller 126 which may comprise a test button 127. The third system 200, unlike the first system 100, may comprise a second fuel line 202 that both cross connects the first fuel tank 108a with the second fuel tank 108b and feeds fuel to the internal combustion engine 104. Alternatively, in an embodiment, a cross connect fuel line may link the first fuel tank 108a with the second fuel tank 108b, a first fuel line may link the first fuel tank 108a with the internal combustion engine 104, and a second fuel line may link the second fuel tank 108b with the internal combustion engine 104. While FIG. 1 and FIG. 2 have described systems for remotely fueling a one fuel tank system and a two fuel tank system, respectively, one skilled in the art will appreciate that the teachings of the present disclosure can readily be extended to systems comprising three fuel tank, systems comprising four fuel tanks, and systems comprising more fuel tanks. It is understood that in different embodiments different numbers and/or types of couplings may be employed, either more or fewer couplings and possibly different kinds of couplings.

Figure 7:
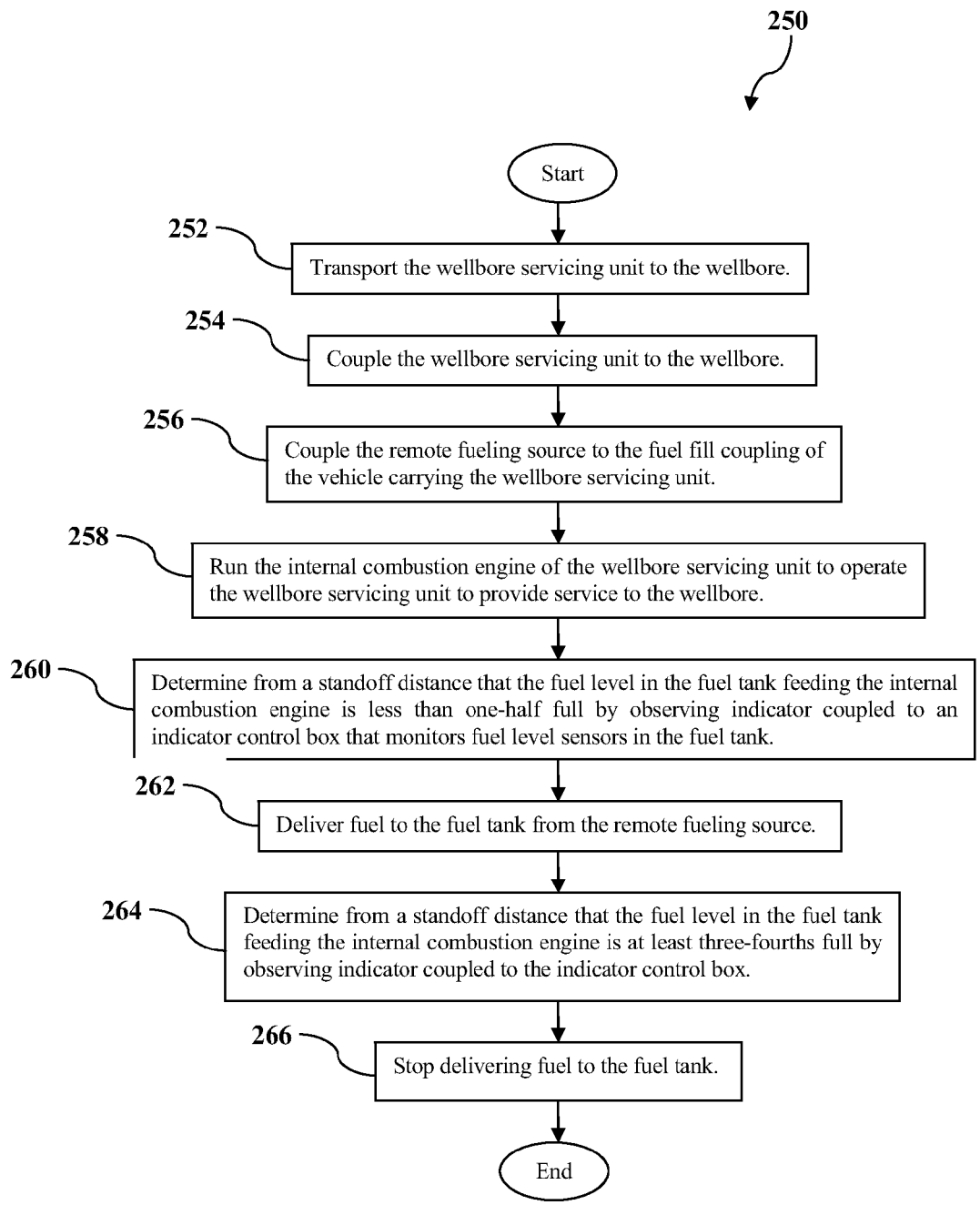
FIG. 7 is a flow chart illustrating a remote fueling method according to an embodiment of the disclosure.

Turning now to FIG. 7, a method 250 is described. For purposes of simplicity, the descriptions below refer to a single tank system such as that described above with reference to FIGS. 1 and/or 3. One skilled in the art will appreciate, however, that the method 250 can be readily adopted for use with the two fuel tank second system 250 described above with reference to FIG. 6 or with systems having more than two fuel tanks. At block 252, the wellbore servicing equipment unit 102 and the first remote refueling system 100 are transported to the wellbore. For example a wellbore servicing vehicle on which the first system 100 is mounted—for example, mounted on board a trailer of a tractor-trailer truck, on board a portion of a bodyload unit vehicle, or some other vehicle—is driven over public roads and/or private roads to the well location. At block 254, the wellbore servicing equipment unit 102 is coupled to the wellbore 164. For example, the high pressure pump 106 may be coupled to the wellbore 164 by one or more high pressure pipes 162. The wellbore 164 may be surmounted with a terminal or manifold for controllably opening or closing one or more ports to the wellbore 164. In some contexts this terminal may be referred to as a Christmas tree or a tree. In an embodiment, the wellbore servicing equipment unit 102 is coupled to a tree surmounting the wellbore 164 by the high pressure pipes 162.

At block 256, the remote fueling source 140 is coupled to the fuel fill coupling 130 of the first system 100. Additionally, the second portion of the fuel distribution channel 128 (e.g., flexible fuel line 156) may be coupled to the first fuel coupling 130 and to the first portion of the fuel distribution channel 128 (e.g., metal fuel line 152) via the second fuel coupling 154. At block 258, the internal combustion engine 104 is started and allowed to run, consuming fuel from the fuel tank 108. The wellbore service is initiated by pumping a wellbore servicing fluid into the wellbore via the high pressure pump 106.

Initially the fuel tank 108 may be full, for example at the start of the wellbore servicing operation, and the first indicator 122 (e.g., green light) may be extinguished and the second indicator 124 (e.g., red light) may be illuminated. Remote fueling personnel may observe the indications of the indicators 122, 124 from the standoff distance 168 and infer that the fuel level in the fuel tank 108 is at least at a second fuel level, for example at least three-fourths full. As the internal combustion engine 104 runs and consumes fuel, the fuel level in the fuel tank 108 drops to less than the second fuel level, for example less than about the three-fourths full level, when the first indicator 122 (e.g., green light) may illuminate and the second indicator 124 (e.g., red light) remains illuminated. Remote fueling personnel may observe the indications of the indicators 122, 124 from the standoff distance 168 and infer that the fuel level in the fuel tank 108 is less than the second fuel level, for example less than about three-fourths full and at least at a first level, for example at least one-half full.

At block 260, it is determined from a standoff distance that the fuel level in the fuel tank 108 is less than the first level, for example less than about one-half full. For example, remote fueling personnel observe the indicators 122, 124 from the standoff distance 168 and see that the first indicator 122 (e.g., green light) is illuminated but the second indicator 124 (e.g., red light) is extinguished. At block 262, fuel is delivered to the fuel tank 108 from the remote fueling source 140. For example, fuel is pumped under pressure by the remote fueling source 140 through the remote fueling line 142 to the fuel distribution channel 128 via the fuel coupling 130. In an embodiment, the fuel is pumped at about 75 pounds per square inch by the remote fueling source 140. Fuel from the fuel distribution channel 128 then flows into the fuel tank 108. As the fuel level in the fuel tank 108 rises above the first level, for example above the about one-half full level, the second indicator 124 (e.g., red light) illuminates and the first indicator 122 (e.g., green light) remains illuminated. Remote fueling personnel may infer that the fuel tank 108 is at least at the first level, for example at least one-half full. As the fuel level in the fuel tank 108 rises above the second level, for example above the about three-fourths full level, the first indicator 122 (e.g., green light) extinguishes and the second indicator 124 (e.g., red light) remains illuminated, thereby signaling to stop the refueling process. The refueling process is carried out from a safe stand-off distance without stopping or interfering with the ongoing wellbore servicing operation. That is, safe refueling may occur concurrently with operation of the internal combustion engine and pump (e.g., during high pressure pumping operations to place the wellbore servicing fluid downhole), which improves both the safety of the wellbore servicing operation as well as improving job efficiency by eliminating any downtime associated with refueling while the engine and/or pump is stopped.

At block 264, it is determined from the standoff distance that the fuel level in the fuel tank 108 is at least at the second level, for example at least at three-fourths full, by observing the indicators 122, 124. For example, remote fueling personnel observe from the standoff distance 168 that the first indicator 122 is extinguished and the second indicator 124 is illuminated and infer that the fuel tank 108 is at least at the second level, for example at least about three-fourths full. At block 266, delivery of fuel to the fuel tank 108 is stopped. For example, remote fueling personnel stop delivery of fuel from the remote fueling source 140 to the remote fueling line 142 or alternatively stop the flow of fuel from remote fueling line 142 to flexible fuel line 156 via disengaging or kick-out of the trigger of elbow coupling 186.

In an embodiment, if delivery of fuel from the remote fueling source 140 to the remote fueling line 142 is not stopped by the remote fueling personnel, when the fuel level in the fuel tank 108 reaches a threshold level—for example about 95% full—the continued in flow of fuel causes the high velocity vent 118 to activate, creating a back pressure that propagates back from the fuel tank 108 to the fuel distribution channel 108, from the fuel distribution channel 108 to the remote fueling line 142, and from the remote fueling line 142 to the remote fueling source 140 and causes a fuel fill handle (e.g., elbow coupling 186) to trip off automatically, stopping further flow of fuel to the fuel tank 108. In an embodiment, the fuel fill handle may trip off automatically in response to about an 8 to 10 pounds per square inch back pressure.

Figure 8:
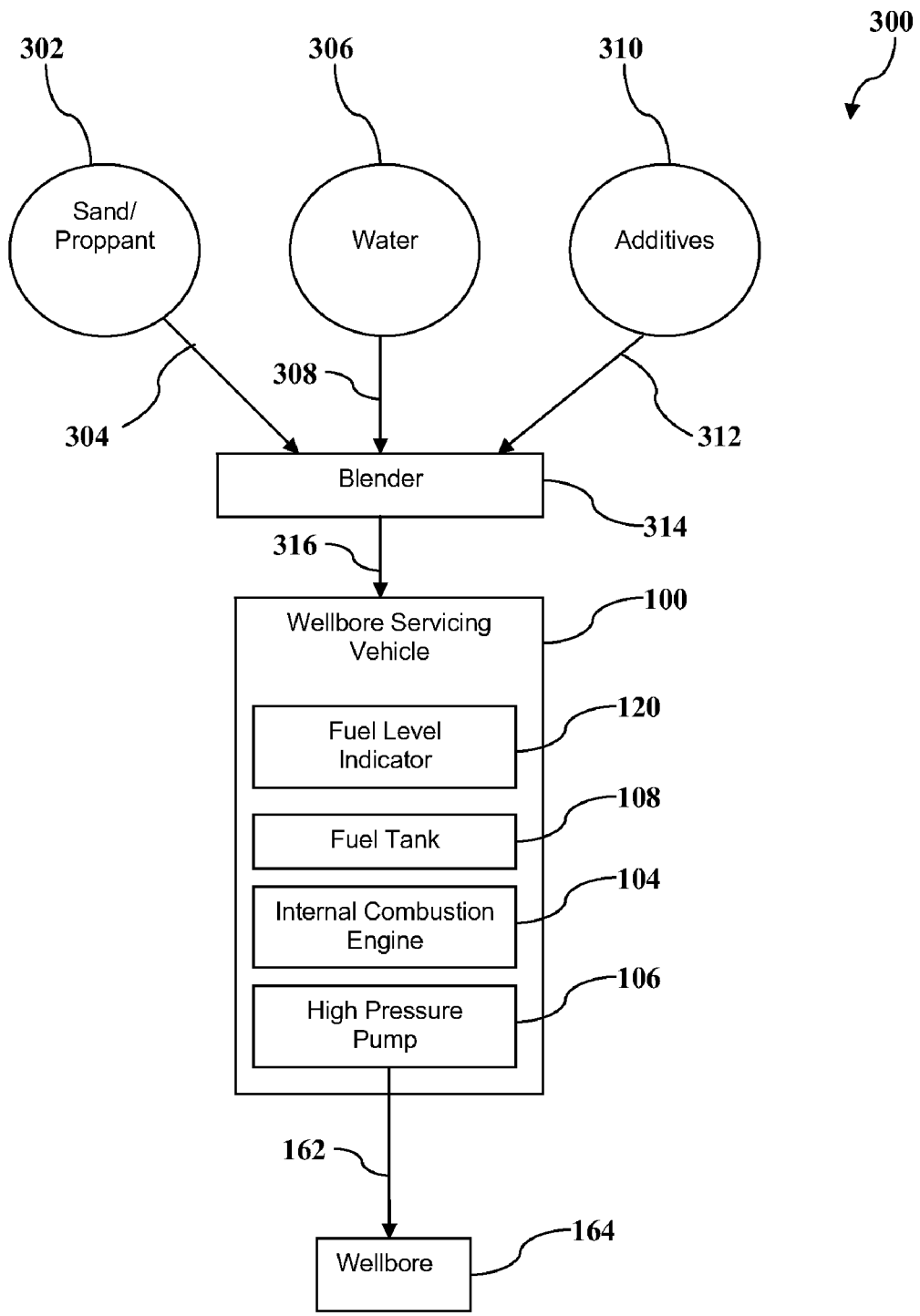
FIG. 8 is an illustration of wellbore servicing system (e.g., a fracturing spread) comprising a remote fueling system to the type described herein.

In an embodiment, a remote fueling system as described herein is used to remotely refuel one or more fuel tanks 108 associated with the internal combustion engine 104 providing power to one or more high pressure pumps 106 during a high pressure wellbore facturing operation. Turning now to FIG. 8, the first remote fueling system 100 is described as part of a wellbore serving system, e.g., a fracturing spread. One skilled in the art will appreciate that the following description could be applied with appropriate modifications to the third remote fueling system 200 described above as well. In an embodiment, the system 100 is part of a fracturing system 300 for fracturing wells in a hydrocarbon reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 300 comprises a blender 314 that is coupled to the system 100 via flowline 316. The system 100 may be referred to in some contexts as a wellbore services manifold trailer and/or associated high pressure pumping trucks/trailers. As used herein, the term "wellbore services manifold trailer" includes a truck and/or trailer comprising one or more manifolds for receiving, organizing, and/or distributing wellbore servicing fluids during wellbore servicing operations. In an embodiment, the flowline 316 is coupled to the high pressure pump 106, and the output of the high pressure pump 106 is coupled to the wellbore 164 by the high pressure pipe 162. Alternatively, the system 100 may comprise a plurality of high pressure pumps 106, the flowline 316 may be coupled to an input manifold, the input manifold may be coupled to each of the high pressure pumps 106, the outputs of each of the high pressure pumps 106 may be coupled to an output manifold, and the output manifold may be coupled to the wellbore 164 by the high pressure pipe 162. The wellbore services manifold trailer may comprise and/or be coupled to a plurality of pumps to achieve a total higher rate of output flow than could be achieved by a single high pressure pump 106 operating alone.

The blender 314 mixes solid and fluid components to achieve a well-blended wellbore servicing fluid. As depicted, sand or proppant 302, water 306, and additives 310 are fed into the blender 314 via feedlines 304, 308, and 312, respectively. The water 306 may be potable, non-potable, untreated, partially treated, or treated water. In an embodiment, the water 306 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In an embodiment, the water 306 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 306 may further comprise local surface water contained in natural and/or manmade water features (such as ditches, ponds, rivers, lakes, oceans, etc.). Still further, the water 306 may comprise water stored in local or remote containers. The water 306 may be water that originated from near the wellbore and/or may be water that has been transported to an area near the wellbore from any distance. In some embodiments, the water 306 may comprise any combination of produced water, flowback water, local surface water, and/or container stored water.

In this embodiment, the blender 314 is an Advanced Dry Polymer (ADP) blender and the additives 310 are dry blended and dry fed into the blender 314. In alternative embodiments, however, additives may be pre-blended with water using a GEL PRO blender, which is a commercially available preblender trailer from Halliburton Energy Services, Inc., to form a liquid gel concentrate that may be fed into the blender 314. The mixing conditions of the blender 314, including time period, agitation method, pressure, and temperature of the blender 314, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before feeding to the high pressure pump 106 and/or the input manifold, in which case the blender 314 may be omitted and the storage tank may feed directly to the high pressure pump 106 and/or the input manifold.

The high pressure pump 106 pressurizes the wellbore servicing fluid to a pressure suitable for delivery into the wellbore 164. For example, the high pressure pump 106 may increase the pressure of the wellbore servicing fluid to a pressure of up to about 20,000 psi or higher. The high pressure pump 106 may comprise any suitable type of high pressure pump, such as positive displacement pumps. The high pressures typically associated with fracturing operations can present many hazards, as described above with reference to FIG. 2. Those skilled in the art will appreciate that during a fracturing job conducted in the field a number of substantially similar wellbore services manifold trailers may be positioned in close proximity to one another and operated concurrently to conduct the fracturing job. The number of manifold trailers operating concurrently may multiply the risks and hazards, as for example if the risk of a high pressure accident within the exclusion zone 166 is X for a single manifold trailer, the risk of a high pressure accident within the exclusion zone 166 when 10 manifold trailers are operating concurrently in close proximity to each other may be approximately 10×. Further, considering the tight quarters that prevail when the manifold trailers are packed cheek-by-jowl on location to perform a fracturing job, it can readily be appreciated that the remote fueling systems of the present disclosure may provide both increased safety as well as convenience.

The high pressure pump 106 and/or output manifold may output wellbore servicing fluid, for example fracturing fluid, at a flow rate of between about 1 BPM to about 200 BPM, alternatively from between about 50 BPM to about 150 BPM, alternatively about 100 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Figure 9:
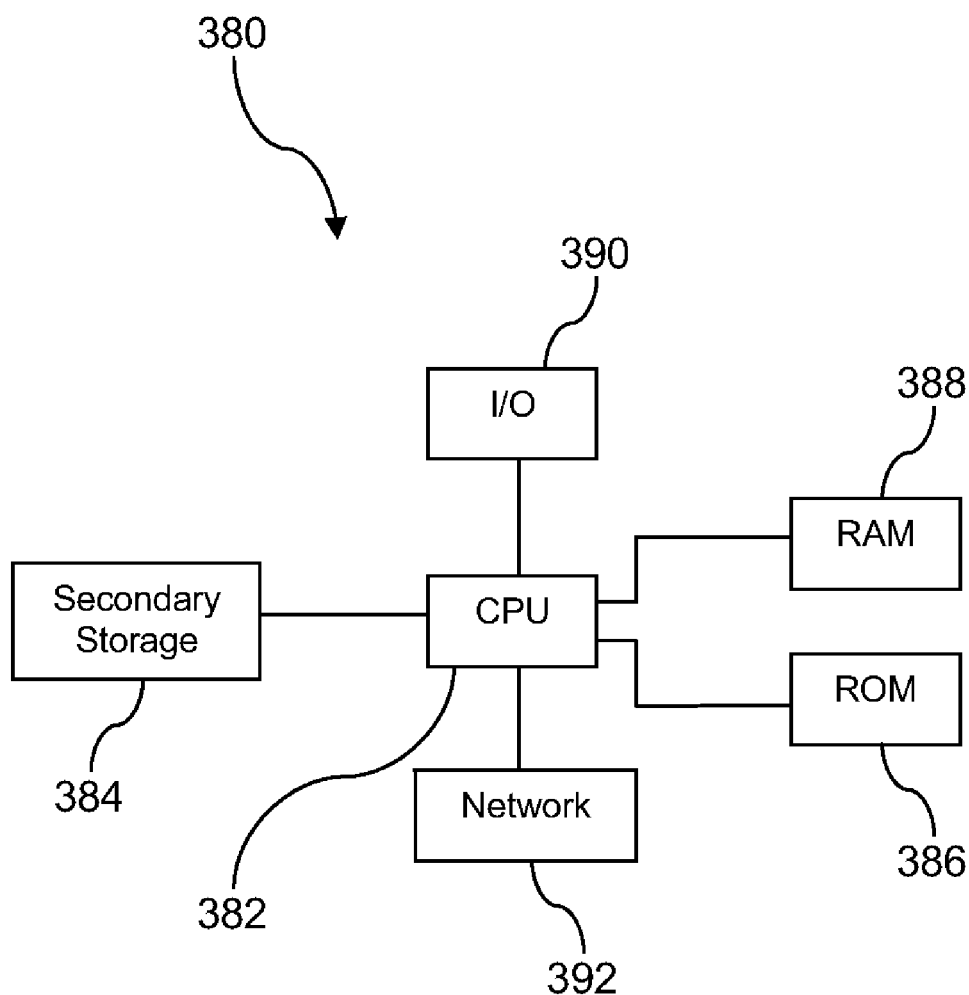
FIG. 9 illustrates an exemplary computer system suitable for implementing the several embodiments of the disclosure.

FIG. 9 illustrates a computer system 380 suitable for implementing one or more aspects of the several embodiments disclosed herein. In an embodiment, portions of the fuel level indicator controller 126, for example the logic portion, may be implemented by the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for remote fueling, comprising:
    a wellbore servicing equipment unit comprising an internal combustion engine;
    a trailer on which the wellbore servicing equipment unit is mounted during transportation to a wellbore and during servicing of the wellbore;
    a first fuel tank coupled to the trailer, the first fuel tank to provide fuel to the internal combustion engine;
    a first fuel distribution channel to flow fuel from a remote end of the first fuel distribution channel to an opposite end of the first fuel distribution channel, wherein the opposite end of the first fuel distribution channel is coupled to the first fuel tank;
    a first fuel level sensor component coupled to the first fuel tank to sense a fuel level inside the first fuel tank;
    a first fuel level indicator to indicate to remote fueling personnel at a standoff distance a fuel level status of the first fuel tank; and
    a fuel level indicator control box coupled to the first fuel level indicator and to the first fuel level sensor component, wherein the fuel level indicator control box commands the indication presented by the first fuel level indicator based on the fuel level inside the first fuel tank sensed by the first fuel level sensor component.

2. The system of claim 1, wherein the standoff distance is at least seventy-five feet from the well bore servicing equipment unit.

3. The system of claim 1, wherein the wellbore servicing equipment unit comprises one of a fracturing unit and a cementing unit.

4. The system of claim 1, wherein a portion of the first fuel distribution channel comprises a metal pipe mechanically attached to the trailer, the metal pipe extending from about a front end of the trailer to proximate to the first fuel tank.

5. The system of claim 4, wherein the metal pipe slopes downwards from the front end of the trailer and wherein the rear end of the metal pipe is at least four inches lower than the front end of the metal pipe when the trailer is parked on a level grade.

6. The system of claim 1, wherein the first fuel tank comprises a high velocity vent, whereby a back pressure is induced in the first fuel distribution channel when the fuel level in the first fuel tank reaches about ninety-five percent full.

7. The system of claim 1, wherein the first fuel level indicator comprises a first light and a second light, wherein the fuel level indicator control box illuminates the first light when the fuel level in the first fuel tank is less than about three-fourths full and wherein the fuel level indicator control box illuminates the second light when the fuel level in the first fuel tank is greater than about one-half full.

8. The system of claim 1, wherein the first fuel level indicator comprises one of a gauge and a meter.

9. The system of claim 1, further comprising:
    a second fuel tank coupled to the trailer, the second fuel tank to provide fuel to the internal combustion engine;
    a second fuel distribution channel to flow fuel from a remote end of the second fuel distribution channel to an opposite end of the second fuel distribution channel, wherein the opposite end of the second fuel distribution channel is coupled to the second fuel tank;
    a second fuel level sensor component coupled to the second fuel tank to sense a fuel level inside the second fuel tank;
    a second fuel level indicator to indicate to remote fueling personnel at a standoff distance a fuel level status of the second fuel tank; and
    wherein the fuel level indicator control box is coupled to the second fuel level indicator and to the second fuel level sensor component, wherein the fuel level indicator control box commands the indication presented by the second fuel level indicator based on the fuel level inside the second fuel tank sensed by the second fuel level sensor component.

10. A remote fueling system, comprising:
    a fuel coupling located at a front of a wellbore servicing vehicle, wherein the fuel coupling is mechanically attached to the wellbore servicing vehicle;

a fuel tank attached to the wellbore servicing vehicle;

plumbing between the fuel coupling and the fuel tank to promote filling the fuel tank with fuel from the fuel coupling, at least some of the plumbing between the fuel coupling and the fuel tank attached to the wellbore servicing vehicle during transportation to a wellbore and during servicing of the wellbore;

a first fuel sensor to determine when a fuel level in the fuel tank is at least at a first level;

a second fuel sensor to determine when the fuel level in the fuel tank is at least at a second level;

a first indicator light;

a second indicator light; and an indicator light control box coupled to the first fuel sensor, to the second fuel sensor, to the first indicator light, and to the second indicator light, wherein the indicator light control box illuminates the first indicator light when the second fuel sensor does not sense the fuel level in the fuel tank is at least at the second level and illuminates the second indicator light when the first fuel sensor senses the fuel level in the fuel tank is at least at the first level.

11. The system of claim 10, wherein when the indicator light control box is inoperative the first indicator light is extinguished and the second indicator light is extinguished.

12. The system of claim 10, wherein the fuel coupling is a cam lock type of coupling.

13. The system of claim 10, further comprising a fuel drain cock attached to the wellbore servicing vehicle, proximate to the fuel coupling, the fuel drain cock for draining residual fuel left over from remote fueling operation.

14. The system of claim 10, wherein the indicator light control box comprises a test button to initiate a test of the indicator light control box function.

15. A remote fueling method, comprising:

transporting a wellbore servicing unit that is coupled to a vehicle to a wellbore, the wellbore servicing unit comprising an internal combustion engine;

coupling the wellbore servicing unit to the wellbore;

coupling a refueling system to a fuel fill coupling mechanically attached to the vehicle, the fuel fill coupling connected via a fuel distribution channel to a fuel tank coupled to the vehicle proximate to the internal combustion engine;

running the internal combustion engine to operate the wellbore servicing unit, the internal combustion engine fueled from the fuel tank;

determining from a standoff distance that a fuel level in the fuel tank is less than a first level by observing an indicator coupled to an indicator control box, the indicator control box coupled to a fuel sensor in the fuel tank;

delivering fuel to the fuel tank from the refueling system;

determining from the standoff distance that the fuel level in the fuel tank is at least at a second level by observing the indicator; and stopping delivering fuel to the fuel tank from the refueling system based on the determination from the standoff distance that the fuel level in the fuel tank is at least at the second level.

16. The method of claim 15, wherein the wellbore servicing unit comprises a high pressure pumping unit.

17. The method of claim 15, wherein the standoff distance is at least seventy-five feet from the location of the wellbore servicing equipment.

18. The method of claim 15, wherein the indicator illuminates a first light when the fuel level in the fuel tank is at least at the first level.

19. The method of claim 15, wherein the indicator extinguishes a second light when the fuel level in the fuel tank is at least at the second level.

20. The method of claim 15, wherein the wellbore servicing unit comprises a high pressure pump, and further comprising pumping a fracturing fluid into the wellbore, wherein the wellbore servicing unit is refueled without interrupting the pumping of the fracturing fluid into the wellbore.

* * * * *